Oct. 18, 1966   R. FICHT   3,279,146
MACHINE FOR BANDING COUNTED STACKS OF FLAT, SHEET-LIKE OBJECTS
Filed Sept. 3, 1964   4 Sheets-Sheet 1

INVENTOR.
REINHOLD FICHT,
BY *Jungbluth, Melville,*
*Strasser & Foster,*
ATTORNEYS.

Oct. 18, 1966  R. FICHT  3,279,146
MACHINE FOR BANDING COUNTED STACKS OF FLAT, SHEET-LIKE OBJECTS
Filed Sept. 3, 1964  4 Sheets-Sheet 2

INVENTOR.
REINHOLD FICHT,
BY Youngblut, Melville,
Strasser & Foster.
ATTORNEYS.

Oct. 18, 1966 R. FICHT 3,279,146
MACHINE FOR BANDING COUNTED STACKS OF FLAT, SHEET-LIKE OBJECTS
Filed Sept. 3, 1964 4 Sheets-Sheet 4

INVENTOR.
REINHOLD FICHT
BY *Youngblut, Melville,*
*Strasser & Foster,*
ATTORNEYS

United States Patent Office 3,279,146
Patented Oct. 18, 1966

3,279,146
MACHINE FOR BANDING COUNTED STACKS OF FLAT, SHEET-LIKE OBJECTS
Reinhold Ficht, Hopfigheim, Germany, assignor to The Printing Machinery Company, Cincinnati, Ohio, a corporation of Ohio
Filed Sept. 3, 1964, Ser. No. 394,173
9 Claims. (Cl. 53—198)

The invention concerns an automatically controlled process of banding counted stacks of flat sheet-like objects one on top of the other such as labels, cardboards, flat folding boxes, sheets of paper, newspapers, letters, etc. by means of a tape crossing the conveying distance of the stacks which are transported by an endless transport chain, and a machine performing all operations of this process.

Many branches of the economy and particularly the beverage industry require large quantities of labels of various kinds for marking different brands of goods or their packages. By means of a tape these labels are banded by the manufacturer in counted stacks of identical labels, and in this form they are delivered to the consumer who holds them in stock. Hitherto the counted stacks of labels have been banded manually by means of a paper strip the ends of which were glued together one on top of the other. Many other branches of industry also require this work of banding several or numerous flat, sheet-like, stacked-up objects such as typing paper, newspapaers, sheets of cardboard, letters, etc.

In an attempt to mechanize this time and wage consuming and, therefore, costly working process a machine has been developed with the purpose of transporting the stacks of paper or labels in an upward direction through a shaft in the speed of the working stroke along a transport chain with a slightly vertical inclination; the stacks are lying on supporting arms that protrude at a right angle from the transport chain and are banded during the same process with an adhesive tape. One end of the adhesive tape is pushed from the front side by means of transport rollers into the track of the stacks; the upper side of the stack receives this end of the tape which is bent to the back side during the following working stroke. The other end of the adhesive tape which, in the meantime, has been cut off in sufficient length is brought in touch with a moistening or glue-coating attachment on the back side of the machine by means of a complicated mechanism which guides the tape from the front side underneath the paper stack to the back side; then the tape is drawn upwards by a folding link moving in a parallel direction to the track of the paper stacks and bent down and glued to the end coming from above. This well-known method of banding stacks of paper or labels only works faultlessly if the working speed is low, almost as low as in the case of banding by hand. The working process performed by this machine, which imitates the process of banding by hand, would never be suitable for high working speeds not even even in connection with some different device of a more perfect design and construction.

The underlying object of the present invention is to create a new method of banding stacks of several flat sheet-like objects one on top of the other such as labels, sheets of cardboard, folding boxes, sheets of paper, newspapers, etc. which can be performed by a relatively simple machine, permits high working speeds, and bands the stacks tightly by prestressing the banding means.

These and other objects of the invention which will be set forth hereinafter or will be apparent to one skilled in the art upon reading these specifications, are accomplished in that machine and method of which an exemplary embodiment will be described. Reference is made to the accompanying drawings wherein:

FIGS. 1a to 1d inclusive show in diagrammatic form the various steps involved in banding a stack of labels in accordance with this invention.

Figure 1A:
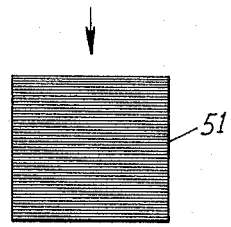
Figure 1B:
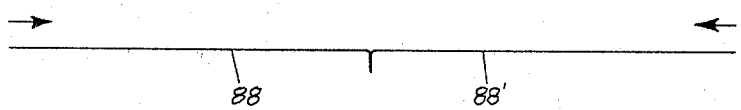
Figure 1B:
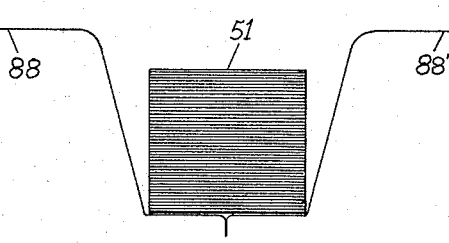
Figure 1C:
Figure 1C:
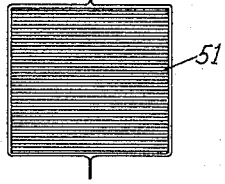

According to the invention, the objects are attained by a new cyclically working process. In one working cycle an unbanded stack is led into the track of two tapes crossing its conveying direction and running oppositely in accordance with the working cycle. The ends of the tapes are solidly connected with one another in parallel to the conveying direction of the stack, thus forming an unsupported stretched tape. The stack bends the tape from both directions into a loop wrapping the stack on three sides and being open on the fourth side. Then tools operating simultaneously in opposite directions from two oposite sides close the loop on the fourth side of the stack in such a way that the ends of the loop are touching one another in a section that lies in parallel with the conveying direction. Now the ends of the loop in this section are joined, and are severed at the joining point in such a way that two tape portions running in opposite directions are solidly connected by part of the joint for the succeeding working cycle, thus forming a stretched unsupported tape crossing the conveying distance.

The inventive process permits an extraordinarily high working speed and can be carried out by a relatively simple machine.

In a particularly favorable embodiment of the inventive machine the stacks are banded with plastic tapes which are welded together at the joints or connecting points under the effect of heat, after which the welded seams are cut through under the effect of heat. It is, however, also possible to band the stacks with paper strips which are connected either by pins or pressure sensitive adhesives.

For the execution of the working process a machine has been developed which consists of two symmetrical side parts resting on a base plate and adjustable in a direction normal to the longitudinal center plane to accommodate for varying height of the stacks by means of regulating devices which are fixed underneath the base plate. Each of the side parts has one upper and one lower chain wheel bearing for the chain wheels, arranged in pairs. Two continuous pair-wise transport chains revolve synchronously and closely side by side in slightly inclined position with supporting blocks adjustable to the height of the stacks and pressure activated levers for clamping the stacks.

Applicant's machine has a driving mechanism anchored in a central support which is secured to the base plate operating the pairs of transport chains of both side parts simultaneously and working cyclically in complete phases, an impulse welding attachment operating in a longitudinal center plane normal to the motion track of the stacks, consisting of two parts and mounted on the central support and on a front support which is connected with the base plate. The welding means serve for welding and separating the plastic tapes which roll off cylinders or drums, cross the conveying path of the stacks and surround them in a loop.

The machine also has mechanical, pneumatic, and/or electric installations for the automatically controlled execution of the working phases and the operations connected therewith.

In a preferred embodiment of the inventive machine the individual transport chains of each chain pair are built in such a way that they are adjustable to each other by means of regulating devices; the supporting blocks are fixed in regular intervals to one transport chain of the pair of chains; and the pressure activated levers are fixed in identical intervals to the other transport chain of the chain pair. By adjusting the transport chains of the chain pairs with respect to each other the distance between supporting blocks and pressure activated levers can be varied at one's choice.

The upper chain wheels for the transport chains of one chain pair rest at the upper chain wheel bearing on a common axle in such a way that they rotate freely towards each other, the outer chain wheel running on a hub of the inner chain wheel. The axles of the upper chain wheels may be secured to chain adjusters connected with the adjustable side parts which permits occasional readjustment of the tension of the transport chains. At the lower chain wheel bearings, the lower chain wheels for the transport chains of a chain pair rest on a common axle and are infinitely adjustable by means of a regulating disc which can be stopped and which connects the chain wheels in a torsion-proof way.

The pressure activated levers which are located at the outer transport chains are preferably built in such a way that they may be opened in receiving position above the impulse welding attachment under the pressure of a spring by the piston rod of a cylinder fixed at one lateral plate of each adjustable side part for receiving the banded stacks and in discharging position underneath the impulse welding attachment by lifting cams fixed at these side plates for releasing the banded stacks.

Two driving chain wheels mounted on the lateral plates of the adjustable side parts and resting on a common driving shaft with multiple spline section in such a way that they may be displaced serve for driving the two pairs of transport chains. These driving chains are bulit like link chains and perform tthe impulsion through a second toothed wheel rim of the outer chain wheels at the lower chain wheel bearings. For occasional readjustment of the tension of the driving chains chain adjusters may be mounted on the side plates with their chain wheels being in gear with the driving chains.

The driving staft with the multiple spline section is preferably driven by a toothed rod which is solidly connected with the piston rod of a driving cylinder in the longitudinal center plane of the machine and which is coupled with a gear wheel movable on the driving shaft in the axial direction. At the end of each completed working phase, this gear wheel can be detached from the toothed rod by means of the cylinder part of an annular piston mounted in a stopping cylinder concentrically with the driving shaft and movable towards it in the axial direction. It engages a counterpart connected with the center support by means of a stopping cam situated at one side of the gear wheel. This inventive construction of the coupling provides that the machine only performs complete cycles even in case of an unexpected stoppage. Moreover, the coupling is stopped when the transport chains are adjusted. This is of advantage because the pressure-activated levers at the outer transport chain can be stopped at the height adjusted to the impulse welding attachment.

The impulse welding attachment consists, for example, of two compressed air cylinders located in the longitudinal center plane outside of the conveying track of the stacks on a common axle running vertically to the conveying track; their piston rods which are directed against each other are carrying welding heads with sliding plates. The compressed air cylinders are mounted on one trestle on the center support and to another trestle on the front support on a horizontal axle in a way that they can be tilted upwards and may give way to a certain extent when the sliding plates run up the stacks. The welding head of the compressed air cylinder mounted on the front support is equipped with a rigidly mounted welding jaw which is electrically heated and provided with a horizontal groove that opens toward the front side. The opposite welding head on the compressed air cylinder that is located at the center support preferably is equipped with an electrically heated welding jaw with low stroke and movable in the axial direction by the pressure of a spring. In its horizontal groove which opens towards the front side there runs a separating wire rigidly mounted to the welding head and electrically heated. When the welding heads are pushed togeher the separating wire slides into the groove of the welding jaw on the opposite side.

Each of the plastic tapes—led over rollers to the welding heads—for banding the stacks is, for example, held on stock on a drum mounted on an extension arm of the center support and on a bearing block underneath the base plate and is equipped with an unwinding retarder.

The lateral limitation of the conveying track of the stacks preferably consists of two lateral guiding rods which are connected with the adjustable side parts and of two rear guiding rods adjustably connected with the center supports by means of adjusting screws. This arrangement permits that stacks may be banded the shape of which is other than rectangular.

Underneath the welding heads of the impulse welding attachment additional heating installations may be arranged outside of the conveying track of the stacks. If shrinking foils are being used for banding the stacks these heating installations improve the pre-stressing of the shrinking foil which is desirable.

Further details, characteristics and advantages of the inventive process and the machine developed in accordance with it may be seen from the following detailed description with reference to the attached drawings which show the diagrammatic course of the inventive working process and a preferred type of a pneumatically driven machine for the execution of this working process.

Figure 2:
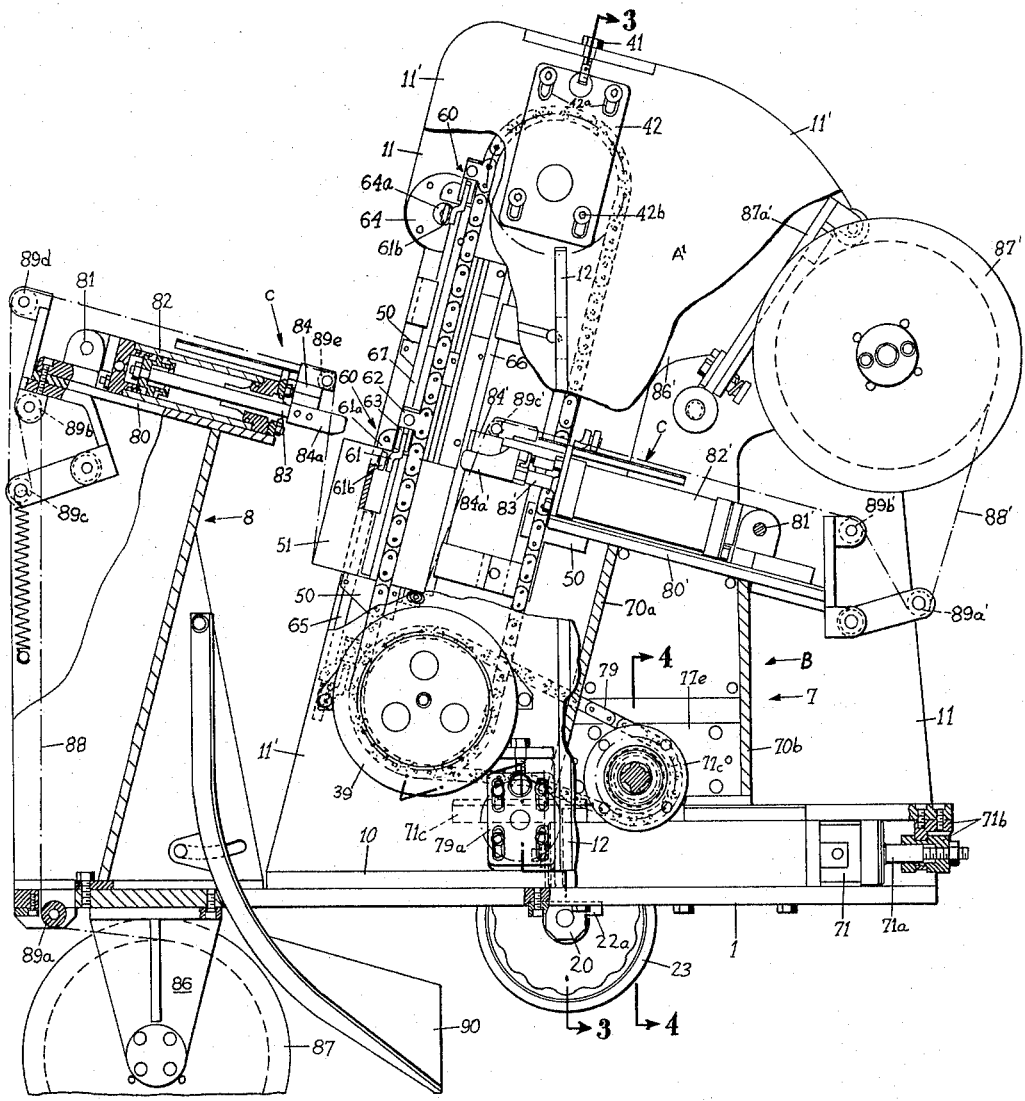
FIG. 2 shows in side elevation a machine for performing the process, the casing of the machine being partially broken away.
Figure 3:
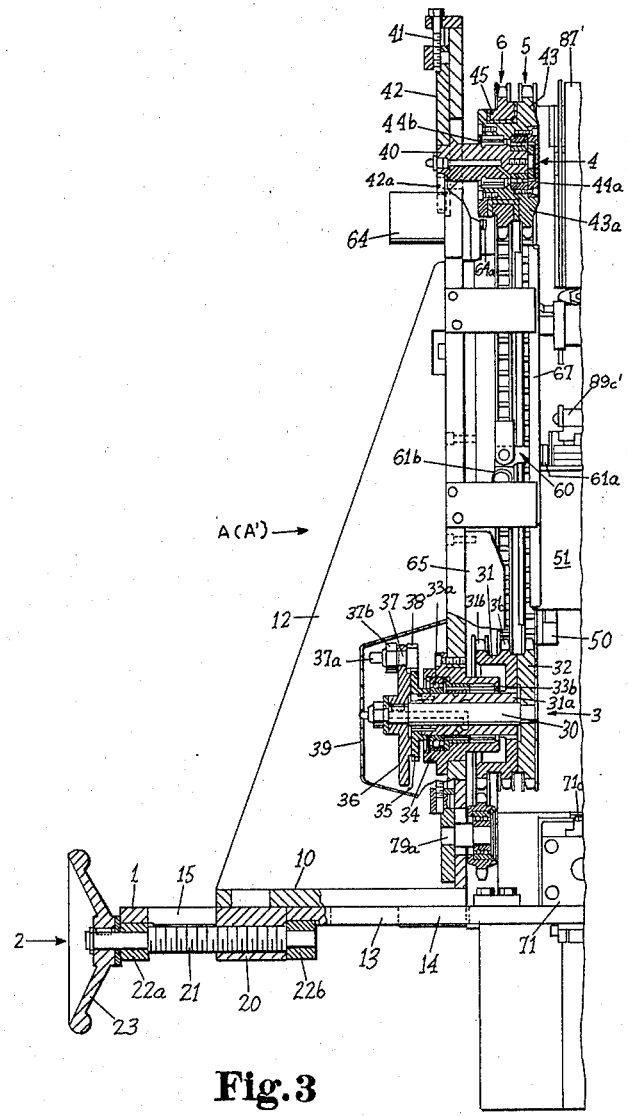
FIG. 3 is a vertical section of the machine taken along the section line III–III of FIG. 2.

Referring to FIGURES 2 and 3 the inventive machine primarily consists of a base plate 1 anchored in a tubular frame (not shown) which forms the machine frame as such.

The main components of the machine are two side parts A, A' resting symmetrically to their longitudinal center plane on the base plate 1, each of them having an adjusting device 2 underneath the base plate 1. FIGURE 3 shows a lower chain wheel bearing 3, an upper chain wheel bearing 4, and two continuous transport chains 5 and 6 which are adjustable relatively to each other and arranged in pairs.

Figure 4:
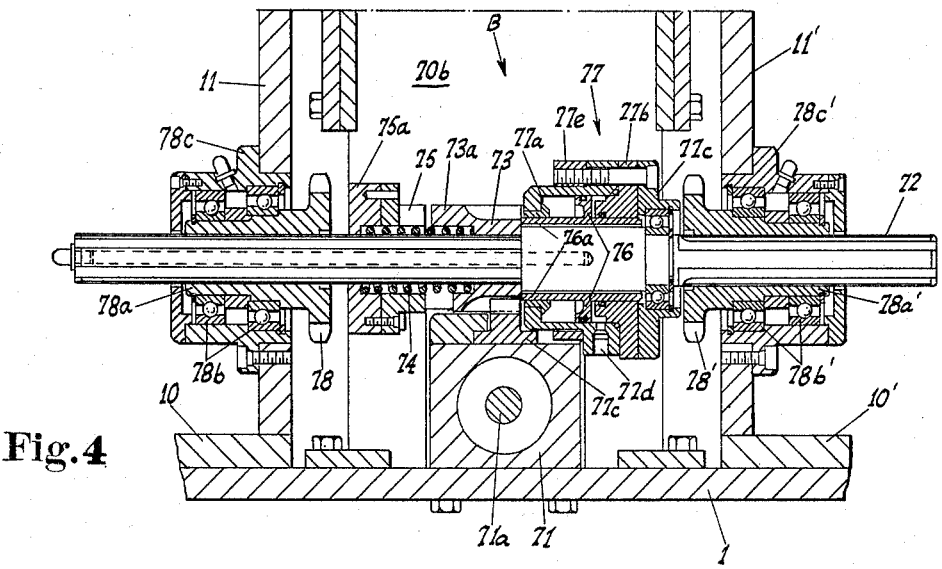
FIG. 4 is a sectional view of the pneumatic drive of the machine taken along the section line IV–IV of FIG. 2.

A pneumatic drive B (see FIGURE 4) is mounted on a center support 7 and operates both transport chains 5, 6 of both side parts A, A'.

An impulse welding attachment C consisting of two parts is mounted on the center support 7 and a front support 8 in the longitudinal center plane of the machine.

The two symmetrical side parts A, A' having lateral side plates 11, 11' rest on the base plate 1, each with an angled foot 10 running parallel to one another and limiting the machine in its total dimension. The feet 10 of each lateral plate 11 rest on either side of right-angled triangular supporting plates 12 which are located normal to the lateral plates 11. Pivots 14 are so mounted that they are guided in oblong holes 13 in the base plate 1 (FIGURE 3). At the front end of the supporting plates 12 nuts 20 are fastener between the two pivots 14 underneath the base of the supporting plate, and guided in oblong holes 15 in the base plate 1. The nuts run on threaded spindles 21 of the adjusting devices 2. The spindle 21 is mounted on two bearings 22a, 22b underneath the base plate 1. At its free end the spindle 20 is equipped with a hand wheel 23.

The chain wheel bearings 3, 4 for the transport chains 5, 6 arranged in pairs are fastened to the lateral plates 11. The lower chain wheel bearing 3, solidly screwed to the lateral plate 11 is equipped with an axle 30 on which runs a chain wheel 31 with a hub built like a slide bearing; the chain wheel 31 has two toothed wheel rims separated from each other. The torque produced by the drive B is transmitted to the toothed wheel rim 31b while the toothed wheel rim 31c holds the outer transport chain 6. At the inner end of the axle 30 a chain wheel 32 for the transport chain 5 is nonrotatably attached. By means of a bearing 33 consisting of a ball bearing 33a and a roller bearing 33b the hub 31a of the chain wheel 31 is mounted to a housing 34 which is screwed to the lateral plate 11. A cogwheel 35 mounted on the axle 30 in such a way that it turns freely, is screwed to the front side of the hub 31a of the chain wheel 31. In front of the cogwheel 35 there is a regulating disc 36 secured by a nut and attached non-rotatably to the free end of the axle 30. At the rim of the regulating disc 36 a pinion gear 38 is mounted which is fixed to a mandrel 37; the pinion gear 38 enmeshes with a cogwheel 35 and can be adjusted by means of a hexagon 37a and stopped by means of a nut 37b. This design of the lower chain wheel bearing 3 is necessary, as described below, in order to permit the adjustment of the transport chains 5, 6 to stacks of varying height. The parts of the lower chain wheel bearing 3 protruding from the lateral plate 11 are protected by a cover 39.

The upper chain wheel bearing 4 is mounted on an axle 40 which is fixed to a chain adjuster 42 that can be regulated by means of a fixing screw 41 (see FIGURE 3). The chain adjuster 42 itself is guided in oblong holes 42a and held by a bolt 42b on the outside of the lateral plate 11. By means of a bearing 44 consisting of a ball bearing 44a and a roller bearing 44b the inner chain wheel 43 is mounted with its hub 43a on the axle 40 in such a way that it can be turned freely. A chain wheel 45 for the outer transport chain 6 is mounted on the hub 43a of the chain wheel 43 which is built, on its outside, as a slide bearing, because both chain wheels 43, 45 are, as a rule, rotating with the same speed during identical cycles and are only moved relatively towards one another when the transport chains 5, 6 are adjusted at the lower chain wheel bearing 3.

At the inner transport chain 5, which is built like a link chain and runs on the toothed rim of the chain wheel 32 at the lower chain wheel bearing 3, and on the toothed rim of the chain wheel 43 at the upper chain wheel bearing 4, there are supporting blocks 50 fixed for the stacks 51 on the inside at regular intervals. At the outer transport chain 6, also built as a link chain, which runs on the toothed rim 31c of the chain wheel 31 at the lower chain wheel bearing 3 and on the toothed rim of the chain wheel 45 at the upper chain wheel bearing 4, pressure activated levers 60 are fitted at identical intervals which correspond to the spacing of the supporting blocks 50. By the combined effect of these pressure activated levers 60 and the supporting blocks 50 the stacks 51 are clamped. The pressure activated levers 60 are equipped with a right-angle bent lever 61 at one end of which a pressure plate 61a lies on the inside of the transport chain 5 parallel to its supporting blocks 50, and at the outer end of which a roll 61b is fitted. The bent lever 61 is mounted on an extension arm 63 in such a way that it can be swivelled under the pressure of a spring. The extension arm 63 is connected with a chain link 62 in parallel with the transport chain 6. In the upper receiving position the roller 61b of the pressure activated lever 60 is in front of a cylinder, 64 fixed to the lateral plate 11, the piston rod of which 64a turns with its advance motion the bent lever 61 and, thus, lifts the pressure plate 61a. Underneath the impulse welding attachment C (hereinafter described) in front of the lower chain wheel bearing 3 a lifting cam 65 is fitted at each lateral plate 11, 11' which protrudes into the conveying track of the rollers 61b; the pressure activated levers 60 are swivelled at this lifting cam 65, thus permitting the discharge of the banded stacks 51. On the way from the receiving spot above to the discharging spot below, the stacks 51 are guided along adjustable rear guiding rods 66 which are in parallel with the transport chains 5, 6 and along lateral guiding rods 67 which are connected with the side parts A, A' and can be adjusted.

The pneumatic drive B (FIGURE 4) of the machine is anchored in a center support 7 which is mounted on the base plate 1 behind the transport chains 5, 6 and between the lateral plates 11, 11'. The center support 7 consists of two cross plates 70a, 70b (see FIGURE 2) resting on the base plate 1 and screwed to it, the one in front (70a) being in parallel with the inclination of the transport chains 5, 6, the one in back (70b) being fitted to the base plate 1. Symmetrically to the longitudinal center plane two square windows are cut into the cross plates 70a, 70b holding a driving cylinder 71, screwed to the base plate 1, with damping on both sides and stroke adjustment.

A toothed rod 71c sliding on the driving cylinder 71 is mounted on a piston rod 71a of the driving cylinder 71 by means of an axially adjustable driver 71b. The motion of the toothed rod 71c is transmitted to a driving shaft 72 with multiple section by means of a cogwheel 73. On the side facing the side part A of the machine the cogwheel 73 has a stopping cam 73a and is placed on the driving shaft 72 in a way that it may be moved in the direction of the axle under the pressure of a spring 74. At the opposite end, the spring 74 is supported by a counterpart 75 for the stopping cam 73a of the cogwheel 73. The counterpart 75 is screwed to an abutment 75a which connects the cross plates 70a, 70b of the center support 7. The axial adjustment of the cogwheel 73 respecting its detachment from the toothed rod 71c is achieved by the cylinder part 76a of an annular piston 76 which can slide to and fro on the driving shaft 72 in a stopping cylinder 77 consisting of a body part 77a, a lid 77b, and a bearing 77c.

The stopping cylinder 77, mounted concentrically to the driving shaft 72 is fastened with its body part 77a, containing an aperture 77d for inlet and outlet of the pressure agent to a cross plate 77e which is itself screwed to the center support 7. The ends of the driving shaft 72 with multiple spline sections are guided through symmetrically built driving chain wheels 78, 78' which are mounted in their hubs 78a, 78b by means of two ball bearings 78b, 78b' on housings 78c, 78c' fitted to the side parts A, A' of the machine. On both sides of the machine the torque is transmitted from the driving chain wheels 78, 78' to the transport chains 5, 6 by means of driving chains 79 which are located at the lower chain wheel bearings 3 on the toothed wheel rim 31b of the cogwheel 31. The tension of both driving chains 79 may be regulated by means of a chain adjuster 79a which is mounted on the lateral plates 11, 11' of the side parts A, A'.

The impulse welding attachment C is mounted on the center support 7 and the front support 8 and consists of two almost identical parts arranged in the longitudinal center plane of the machine and directed normal to the motion of the stacks 51. On two trestles 80, 80' which are connected with the front support 8 respecting the center support 7, two compressed air cylinders 82, 82' are mounted along horizontal axles 81, 81' in such a way that they may be swivelled. From each compressed air cylinder 82, 82' protrudes in the direction of the transport chains 5, 6 a piston rod 83, 83', which bears a welding head 84, 84' with sliding plates 84a, 84a'.

Figures 5A, 5C:
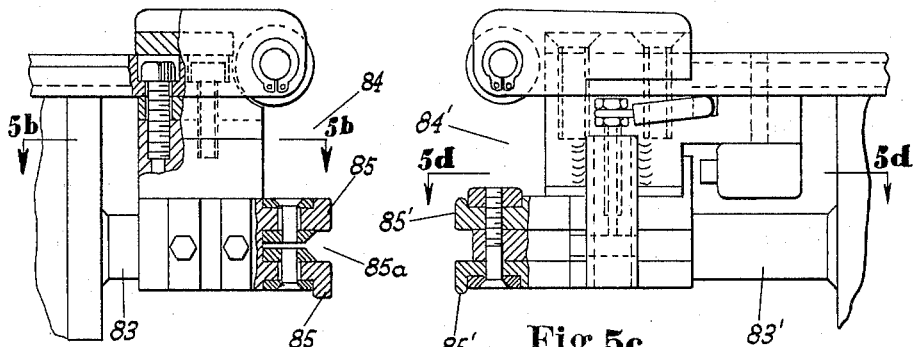
FIGS. 5a to 5d show the parts of an impulse welding device, FIG. 5a being an elevational view of the front welding head without its casing, FIG. 5b being a top plan view of the same head, FIG. 5c being an elevational view of the rear welding head without its case, and FIG. 5d being a plan view of the same head.
Figure 5B:
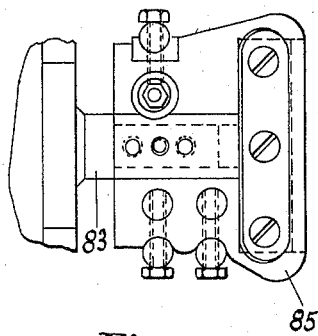
Figure 5D:
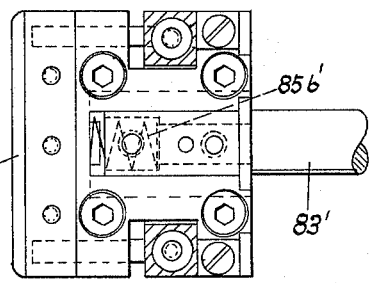

The front welding head 84 is equipped with two electrically heated welding jaws 85 which lie horizontally one above the other and are separated by a groove 85a (see FIGURE 5a). The opposite welding head 84' also has two electrically heated welding jaws 85' one lying horizontally above the other and having between them an electrically heated separating wire 85a' (see FIGURE 5d). The welding jaws 85' of the rear welding head 84' are mounted on the welding head in such a way that they may be moved under the pressure of a spring 85b', and the respective compressed air cylinder 82' has a slightly bigger stroke than the compressed air cylinder 82 in front which means that, in the welding position, the front welding jaws 85 push back the rear welding jaws 85' and the electrically heated separating wire 85' engages into the groove 85a of the welding jaw 85.

On a bearing block 86 fixed underneath the base plate 1 a drum 87 is mounted around which a plastic tape 88 is wound. The plastic tape 88 is guided in front of the welding head 84 over rollers 89a, 89b, 89c, 89d, and 89e, on an extension arm 86' of the center support 7 another drum 87' with an unwinding brake 87a' is mounted around which another plastic tape 88' is wound. The plastic tape 88' is led in front of the rear welding head 84' over rollers 89a', 89b', 89c', 89e' and is joined there with the plastic tape 88, thus forming a continuous tape.

The inventive machine for banding counted stacks works as follows:

In the receiving position the rod 64a of the cylinder 64 has moved out and has the pressure activated lever 60 turned upwards. A stack 51 is now laid in against the rear guiding rods 66, between the lateral guiding rods 67 and the supporting blocks 50 fastened to the transport chains 5, 6, and the pressure activated levers 60. For the succeeding working phase the piston rod 71a of the driving cylinder 71 is pulled in. The annular piston 76 of the stopping cylinder 77 is also pulled in and the cogwheel 73 engages with the toothed rod 71c. Before the piston rod 71a of the driving cylinder 71 is moved out, the fluid pressure is released from the cylinder 64, and the pressure activated lever 60 clamps the laid in stack 51. The following working phase transports the stack 51 underneath the sliding plates 84a, 84a' of the welding heads 84, 84'. This transport distance corresponds to one stroke of the driving cylinder 71. While the stopping cylinder 77 is charged with compressed air, the cogwheel 73 is detached by the cylinder part 76a of the annular piston 76 and the toothed rod 71c is pulled back into its initial position by the piston rod 71a of the driving cylinder 71. The compressed air cylinders 82, 82' of the impulse welding attachment C are charged with compressed air, and the welding heads 84, 84' advance towards each other above the stack 51. The welding heads 84, 84' take along the plastic tape which the stack 51 has drawn after it, and which consists of portions of the plastic tapes 88, 88' unwound from the drums 87, 87'. The welding heads 84, 84' now wind the plastic tape in a loop around the stack 51. When the welding heads 84, 84' are advanced towards one another the welding jaws 85, 85' are pushed against each other. Thus, the rear welding jaw 85' which is moved forward under the pressure of the spring 85b' closes an electric circuit which heats the two welding jaws 85, 85' and the separating wire 85a' lying in the groove 85a of the front welding jaw 85. During the welding process the plastic tapes 88, 88' are welded together at two areas over the stack 51 and, at the same time, are severed between these areas. This means that a new freely stretched tape has been formed ready for banding the next stack 51. The welding time of approximately 2 seconds corresponds to the time necessary for introducing the following stack 51. The succeeding working phase conveys the banded and cut off stack 51 towards the discharging point, while the following stack 51, newly introduced, is transported underneath the impulse welding attachment C. Underneath the impulse welding attachment C the pressure activated levers 60 are automatically turned when their rollers 61b are pushing towards the lifting cams 65. The discharged stacks are falling on a slide plate 90 anchored in the front support 8 and adjustable in its inclination, and are removed from underneath the machine.

Figure 1D:
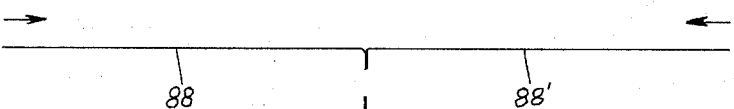
Figure 1D:
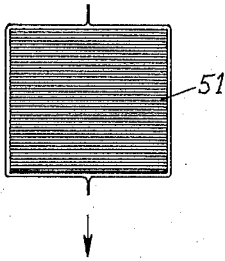

FIGURES 1a to 1d illustrate diagrammatically the steps in the banding operation. In FIGURE 1a the stack of labels 51 is shown as lying above the plastic tape formed from parts 88 and 88' which are welded together as shown. As the stack 51 moves downwardly in the direction of the arrow. The band begins to form a loop about it as in FIGURE 1b. The final action of the welding heads of FIGURES 5a to 5d is to wrap the band completely around the stack and seal its ends together. The seal is severed along the dotted line in FIGURE 1c; the banded stack passes downwardly to the point of discharge, and the band itself is reformed by joining parts 88, 88', as shown in FIGURE 1d, so as to be ready for the banding of the next stack.

For banding a stack of different size the following parts of the machine have to be readjusted: the side parts A, A' to the length of the stack the rear guiding rods 66 to the width of the stack and the supporting blocks 50 to the height of the stack 51.

The side parts A, A', as has been described above, are adjusted to the new length of the stack 51 by means of the adjusting devices 2 by turning the hand wheels 23. The rear guiding rods 66 are fixed by means of clamping screws (not shown on the drawings) which permits their easy loosening and adjustment. For adjusting the supporting blocks 50 to a smaller or greater height of the stacks 51, in each side part A, A' the nuts 37b are loosened which are located underneath the protecting cover 39, and by turning the hexagons 37a the inner transport chains 5 on which the supporting blocks 50 are mounted can be adjusted until the inner distance between a supporting block 50 and the lower edge of the welding heads 84, 84' corresponds to the height of the stacks 51. The pressure activated lever 60 which is also adjusted to the lower edge of the welding heads 84, 84' must not be regulated at the same time. Therefore, the cogwheel 73 in drive B has to be locked in order to prevent the turning of the transport chains 6 on which are mounted the pressure activated levers 60.

The embodiments of the invention in which an exclusive property or privilege is claimed are defined as follows:

1. Machine for performing the process of banding stacks of flat objects by simultaneously severing and sealing around a stack some tape of thermoplastic material characterized in that: two symmetric side parts rest on a base plate vertically, adjustable to the length of the stacks by means of adjusting devices mounted underneath the base plate, each of the side parts bearing one lower chain wheel bearing and one upper chain wheel bearing for the paired chain wheels of two endless transport chains which are arrranged in pairs and run synchronously in a slightly inclined position and are equipped with supporting blocks adjustable to the height of the stacks and pressure activated levers for clamping the stacks; a common drive for both transport chains anchored in a center support mounted on the base plate, an impulse welding attachment consisting of two parts mounted on the center support and on a front support which is connected with the base plate, operating in the longitudinal center plane transverse to the conveying track of the stacks for welding and severing plastic tapes that are unrolled from drums and traverse the conveying track of the stacks, surrounding the stacks in a loop; and motive means for energizing the operating parts of said machine, the chain wheels for the transport chains of one chain pair resting at the lower chain wheel bearing on a common axle and being infinitely regulatable by means of a stoppable adjusting disc connecting the chain wheels, and characterized by two cylinders arranged above the impulse welding attachment for turning the pressure activated levers at the outer transport chain into receiving position by means of piston rods under the pressure of a spring, and mounted on the lateral plates of the said side parts and further characterized by two lifting cams fastened to the lateral plates underneath the impulse welding attachment whereby the pressure activated levers are opened for releasing the banded stacks.

2. A machine according to claim 1 characterized by driving chain wheels mounted on the side plates of the side parts and movably connected to a common driving shaft with multiple spline sections; the driving chains running over these driving chain wheels acting to drive the transport chains over the toothed wheel rims of the outer chain wheels at the lower chain wheel bearings.

3. A machine according to claim 2 characterized by a cogwheel arranged on a driving shaft in gear with a toothed rod which is movable back and forth in the longitudinal center plane of the machine by means of the piston rod of a driving cylinder equipped with a stopping cam and axially movable under the pressure of a spring whereby at the end of each completed working cycle the cogwheel is detached from the toothed rod.

4. A machine according to claim 2 characterized by two compressed air cylinders placed in the longitudinal center plane of the machine outside of the conveying track of the stacks on a common axle running vertically to the conveying track the compressed air cylinders being mounted in a horizontal plane on trestles one of which is fastened to the center support and the other of which is fastened to the front support in such a way that they may be tilted upwards.

5. A machine according to claim 4 characterized by the fact that the welding head of the welding cylinder that is mounted on the front support is equipped with a rigidly mounted, electrically heated welding jaw provided with a horizontally running groove which opens towards the front side.

6. A machine according to claim 4 characterized by the fact that the welding head of the welding cylinder that is fastened to the center support is equipped with an axially movable electrically heated welding jaw which is provided with a horizontal groove opening towards the front side containing a rigidly fastened electrically heated severing wire.

7. A machine according to claim 6 characterized by two drums for the plastic tapes provided with an unrolling brake one of the drums being mounted on a bearing block underneath the base plate and the other on an extension arm on the center support.

8. A machine according to claim 7 characterized by two lateral guiding rods connected with the adjustable side parts and by two rear guiding rods for the stacks adjustably connected with the center support by means of clamping screws.

9. A machine according to claim 7 characterized by heating means arranged underneath the welding heads of the impulse welding attachment outside of the conveying track of the stacks for pre-heating a shrinking foil used for banding the stacks.

References Cited by the Examiner

UNITED STATES PATENTS

| | | | |
|---|---|---|---|
| 2,741,885 | 4/1956 | Allison | 53—198 |
| 3,019,886 | 2/1962 | Winkler et al. | 198—134 |

FOREIGN PATENTS 148,931   11/1931   Switzerland.

FRANK E. BAILEY, *Primary Examiner.*

L. S. BOUCHARD, *Assistant Examiner.*